R. G. HARTLE.
TIRE PROTECTOR.
APPLICATION FILED MAY 24, 1910.
990,046.
Patented Apr. 18, 1911.
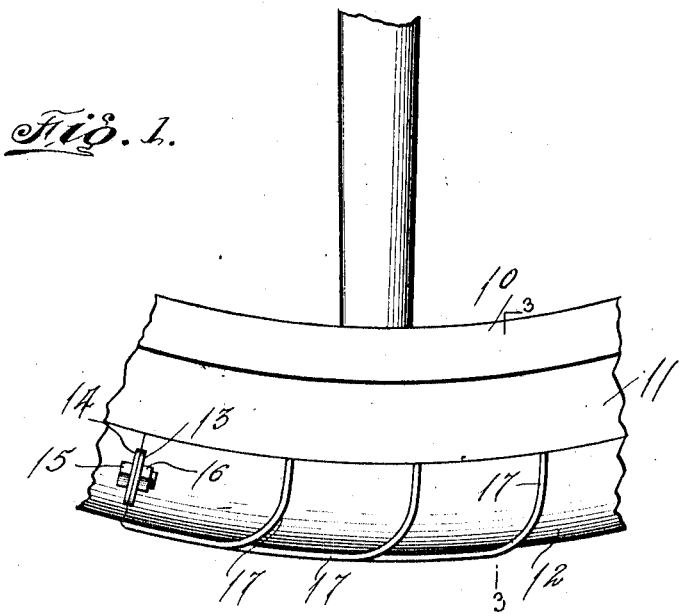
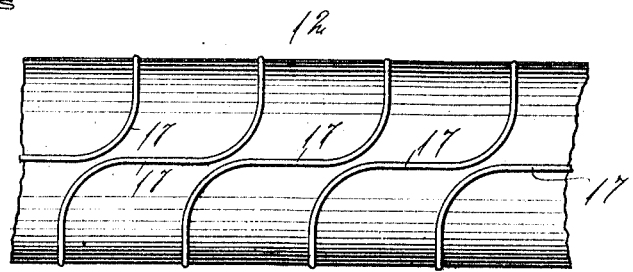
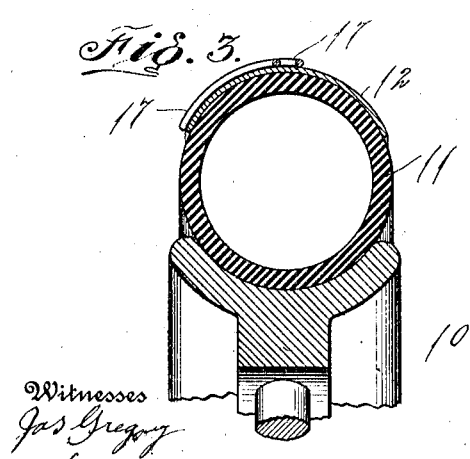
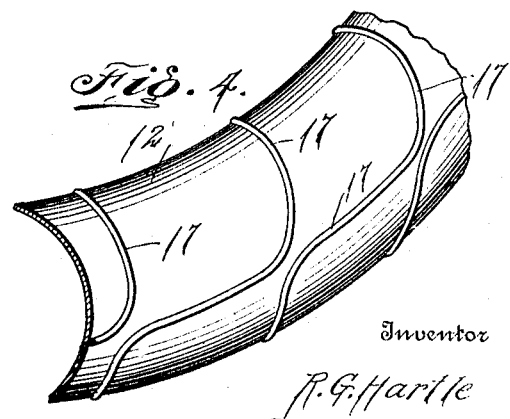
Witnesses
Jas Gregory
Henry T. Bright
Inventor
R. G. Hartle
By Chandler & Chandler
Attorneys

UNITED STATES PATENT OFFICE.

RUDDLE G. HARTLE, OF NEW MADRID, MISSOURI.

TIRE-PROTECTOR.

990,046.

Specification of Letters Patent. Patented Apr. 18, 1911.

Application filed May 24, 1910. Serial No. 563,202.

*To all whom it may concern:*

Be it known that I, RUDDLE G. HARTLE, a citizen of the United States, residing at New Madrid, in the county of New Madrid, State of Missouri, have invented certain new and useful Improvements in Tire-Protectors; and I do hereby declare the following to be a full, clear, and exact description of the invention, such as will enable others skilled in the art to which it appertains to make and use the same.

This invention relates to tire protectors.

The object of the invention resides in the provision of a protector for pneumatic tires adapted to be easily and quickly applied and detached from association with the tire.

A further object of the invention resides in so constructing the protector that same will effectually prevent puncturing of the tire and the slipping of same upon muddy roads and which at the same time is so constructed that it will not impart any appreciable jar or vibration to a wheel during travel.

A still further object of the invention resides in the provision of a tire protector which will be simple in construction, efficient in use, and comparatively inexpensive to manufacture.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which;

Figure 1 is a side elevation of a fragment of a wheel provided with a pneumatic tire having the improved protector associated therewith; Fig. 2, a plan view of what is shown in Fig. 1; Fig. 3, a section on the line 3—3 of Fig. 1; and, Fig. 4, a detail perspective view of a fragment of the protector.

Referring to the drawings, 10 indicates the portion of the wheel felly shown and 11 the pneumatic tire of ordinary construction fitted to the felly.

The protector is shown as comprising a cover 12 formed preferably of heavy leather and cupped so as to have a cross section corresponding to the cross section of the tire to which it is applied; said cover being adapted to snugly receive the tire. When the cover 12 is applied to a tire it will of course be understood that it is of such length that its ends are in close proximity. Each of said ends are provided at corresponding points on opposite sides with apertured lugs 13 and 14 respectively and passing through the apertures of the lugs 13 and 14 disposed on the same side of the cover 12 are bolts 15 which have mounted on their threaded end a thumb nut 16 through the manipulation of which the lugs 13 and 14 may be forced toward each other and thus firmly secure the cover upon the tire. Secured to and disposed upon the other face of the cover 12 is a series of spaced cleats or ribs 17. These cleats or ribs are secured to the cover 12 in any suitable manner and are curved intermediately so as to extend diagonally of said cover. The curvature of these cleats is such that the foremost and rearmost portions of adjacent cleats disposed above the tread portion of the tire will be located simultaneously within the bearing area of the tread of the tire and as a result of this structure jar and vibration so common in cases where chains are used to prevent slipping of the wheel, is obviated.

What is claimed is:

A tire protector comprising a flexible cover adapted for detachable application to a pneumatic tire, and a series of spaced cleats having their terminal portions extending transversely of and their intermediate portions longitudinally of the cover; the rear and front ends of intermediate portions adjacent the cleats being disposed in spaced relation to and overlapping each other so that portions of adjacent cleats will be located simultaneously within the bearing area of the tread of the tire.

In testimony whereof, I affix my signature, in presence of two witnesses.

RUDDLE G. HARTLE.

Witnesses:
N. E. BONIFIELD,
R. F. BAYNES.